Jan. 17, 1950     J. M. STEIN ET AL     2,495,189
CONDUIT BOX FOR SINGLE-PHASE MOTORS
Filed Aug. 28, 1947
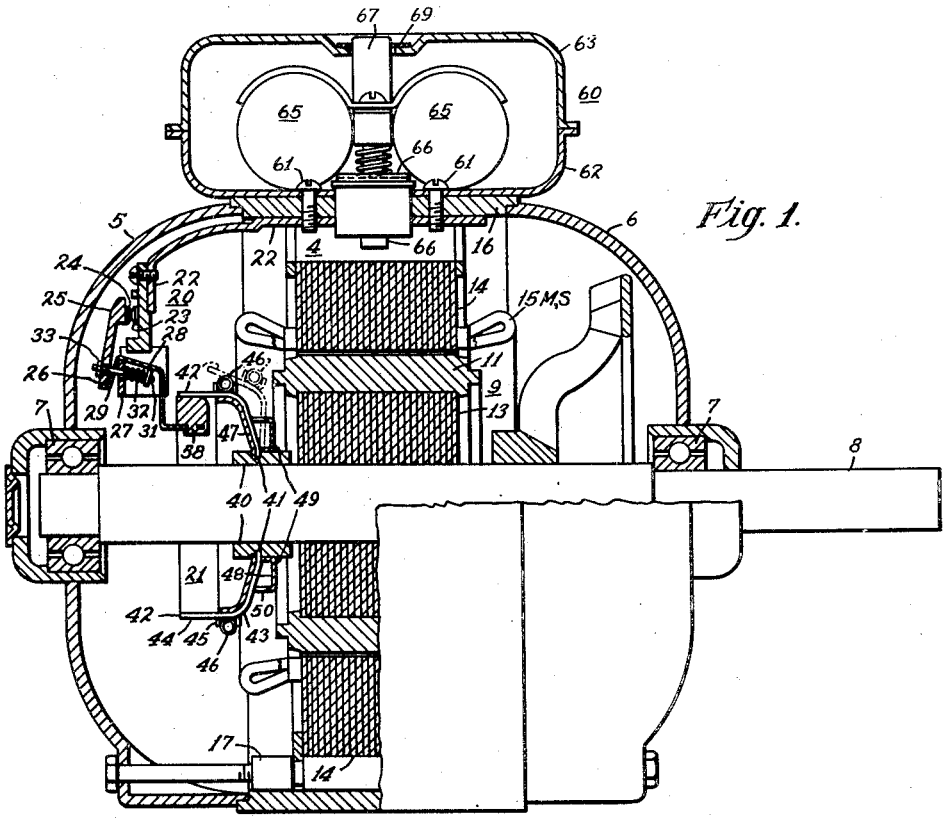
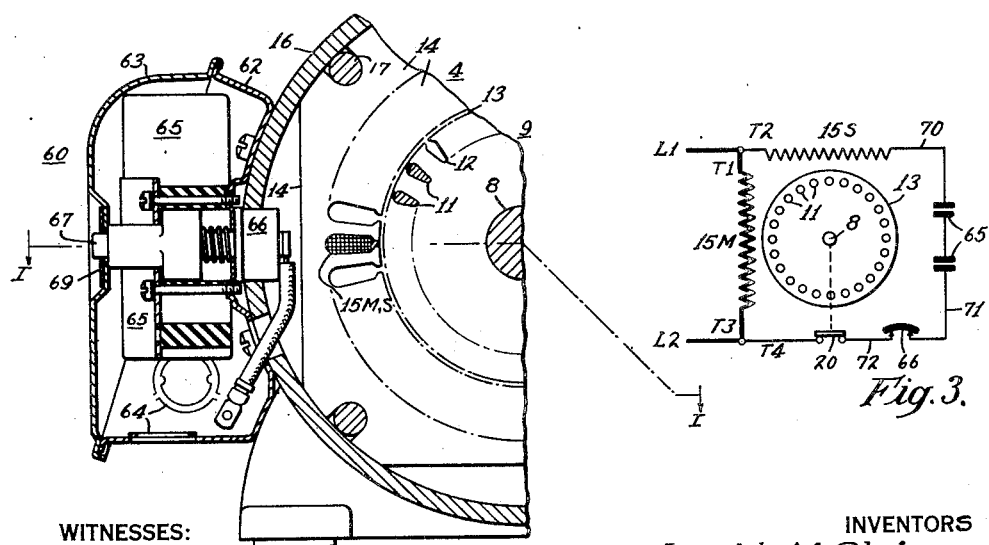
INVENTORS
Joseph M. Stein and
Robert W. Egglestone.
BY
ATTORNEY Patented Jan. 17, 1950

2,495,189

UNITED STATES PATENT OFFICE 2,495,189

CONDUIT BOX FOR SINGLE-PHASE MOTORS

Joseph M. Stein and Robert W. Egglestone, Buffalo, N. Y., assignors to Westinghouse Electric Corporation, East Pittsburgh, Pa., a corporation of Pennsylvania Application August 28, 1947, Serial No. 771,043

3 Claims. (Cl. 318—221)

Our invention relates to a special conduit-box for single-phase induction-motors, the box being special in being enlarged so as to receive not only the terminals for the main and starting windings of the motor, but also an electrostatic capacitor-means for series connection to the starting-winding, or a thermal protective device for protecting the motor against excessive temperatures, or both. This special conduit-box has particular significance in connection with the motor-design, as will be subsequently explained.

Our invention relates to the single-phase part of a new, entirely redesigned line of general-purpose squirrel-cage motors which have been specially designed for convertibility of the motor-frames, so that a minimum number of parts have to be changed in order to convert to or from the different types of protected machines, such as drip-proof, splash-proof, totally enclosed, and the like, as covered in an application of Ludwig et al., Serial No. 690,628, filed August 15, 1946, and assigned to the Westinghouse Electric Corporation.

An object of our invention is to provide a line of convertible single-phase motors which use, as far as possible, the same frame-parts and the same stator-punchings as are used in the corresponding line of polyphase motors. We have succeeded in using the same frames, brackets, and stator-punchings as are used in the polyphase motors, but some of our single-phase motors require rotor-punchings which are different from those which are used in the polyphase line. In addition to the parts which are used on polyphase motors, a single-phase motor requires a centrifugal switch, an electrolytic capacitor or capacitors, and sometimes a thermal protective device of either the manual-reset or automatic type.

In the designs of general-purpose single-phase capacitor-start squirrel-cage motors which preceded our present invention, the capacitors, the thermal protector, and the stationary part of the centrifugal switch were all mounted within, and carried by, one of the bracket-bells of the motor. If we had continued this practice, in our new line of single-phase motors, we would have had to provide a special bracket for containing these single-phase parts, because the bracket which is used on the polyphase machines is too small to house the capacitors (two capacitors being commonly used). Furthermore, the old bracket-mounting of the special single-phase parts necessitated the drilling and tapping of the bracket for mounting the capacitor-clamps, the stationary switch-element, and the thermal-protective device. The end-bell mounting of these single-phase parts has also involved the necessity for disturbing the terminal-connections of the motor whenever it has been necessary to remove the end-bell, and it has also militated against the ready convertibility of the motor, from one type of protected machine to another, as in converting from a drip-proof motor to a splash-proof motor, which requires the addition of a splash-proof hood over the brackets, or as in converting from a drip-proof motor to an enclosed motor, which runs too hot to permit the electrolytic capacitors to be mounted inside of the motor.

It is an object of our invention to provide a new type and location of mounting of the electrolytic capacitor or capacitors, or of the thermal-protector, or both, when both are used, without requiring any extra mounting-screws at all, and without interfering with the complete convertibility of the motor from one type of protected machine to another.

More specifically stated, it is an object of our invention to provide an enlarged conduit-box for the terminals of the main and starting windings, and for the terminals of the centrifugal switch, placing the electrolytic capacitors and the thermal-protector (when used) within this enlarged conduit-box, and mounting this conduit-box externally on the stator-frame in a position where it does not interfere at all with the convertibility-features of the motor or the easy removability of the end-brackets.

With the foregoing and other objects in view, our invention consists in the dynamo-electric machines, combinations, assemblies, parts, structures, and the methods of design and operation hereinafter described and claimed, and illustrated in the accompanying drawing, wherein:

Fig. 1 is a horizontal longitudinal sectional view of a one H. P., four-pole, 1740 R. P. M., induction-run capacitor-motor, embodying our invention by way of illustration, the section-plane being indicated approximately by the line I—I in Fig. 2;

Fig. 2 is a fragmentary central transverse section through the motor; and

Fig. 3 is a diagram of the motor circuit-connections.

As shown in the drawing, our invention is illustrated as being applied to a single-phase capacitor-start induction-motor, having a stationary primary member 4 having removable front and rear end-brackets 5 and 6 at the respective ends thereof. Each end-bracket has a centrally disposed bearing 7, which supports the shaft 8 which carries the rotor-member 9 at an intermediate point on the shaft, between the two bearings 7. The rotor-member 9 is a squirrel-cage member, having an aluminum squirrel-cage winding 11, cast integrally within the slots 12 of the rotor-core 13. The stationary primary member 4 has a stator-core 14 which carries main and starting windings 15M and 15S.

It will be noted that the stator-core 14 is made with square punchings having rounded corners, thus providing four axially extending ventilating-spaces between the flat sides of the primary-punchings 14 and the cylindrical stator-frame 16. This is in accordance with the previously mentioned Ludwig et al. application on the convertible feature. It is also to be noted that the rounded corners of the stator-punchings 14 are held by a locking-bar assembly 17, which is more specifically described and claimed in an application of Goodwin et al., Serial No. 690,629, filed August 15, 1946, now Patent No. 2,447,645, and assigned to the Westinghouse Electric Corporation.

As more particularly described and claimed in a copending application of J. M. Stein and J. R. Greenemeyer, Serial No. 771,042, filed Aug. 28, 1947, we provide a centrifugal-switch device comprising a stationarily supported pivoted contact-making-and-breaking switch 20, and a radially expansible centrifugal device 21. The switch 20 is disposed inside of, and adjacent to, the front end-bracket 5, and it is carried by a mounting-bar 22 which is connected to the stator-frame 16, preferably extending in one of the axial ventilating-spaces between the frame and one of the flat sides of the stator-core 14. The centrifugal device 21 is mounted on the shaft 8, between the switch 20 and the front end of the rotor-core 13.

The switch 20 has a stationary contact 23 and a movable contact 24, the latter being carried by a movable contact-arm 25 having a perforated, approximately flat, rear end 26. The switch-mounting part of the mounting-bar 22 comprises a perforated, approximately flat mounting-piece 27 which is spaced from the shaft 8, in a plane which is approximately normal to the shaft. The switch is provided with an operating-handle 28 having a bent, perforated, approximately flat, rear end 29 which overhangs the mounting-piece 27 and is disposed between the outer face of said mounting-piece and the flat rear end 26 of the contact-arm 25. The switch is further provided with a suitable spring-means for biasing it toward its open position, this spring-means being illustrated in the form of a doubly headed pin 31 whch extends through the perforations in the contact-arm 25, the handle 28, and the mounting-piece 27, respectively, the inner end of said pin being encircled by a compression-spring 32 which abuts against the inner face of the mounting-piece 27. The head at the outer end of the pin 31 is preferably in the form of a nut 33, for convenience in assembly, and for providing a means whereby the pressure of the compression-spring 32 may be adjusted.

The centrifugal device 21 comprises a hub 40 which is mounted on the shaft 8. This hub is preferably provided, in its outer cylindrical surface, with an annular groove 41, which provides a pivotal mounting-seat for the inner ends of a plurality of bent segmental devices 42, which are conveniently stamped out of sheet-metal. Each of these bent segmental devices 42 has a nearly radially extending rear end 43, which is pivotally seated in the groove 41, and a nearly cylindrical-segmental front end 44. On a rear part of its cylindrical-segmental front end 44, each of the bent segmental devices 42 is provided with outwardly projecting garter-spring retaining tabs 45, which may be conveniently provided by struck-out portions of the sheet-metal blank from which the bent segmental device 42 is made. A garter-spring 46 encircles all of the segmental devices, in a position which is retained by said tabs 45. The several segmental devices 42 are all closely spaced from each other, and their front ends 44 together make a substantially complete, approximately cylindrical annular member which is expansible and contractible.

In the non-responsive state of the centrifugal device 21, as shown in full lines in Fig. 1, the cylindrical-segmental front ends 44 of the several segmental devices 42 are close together, almost in contact with each other; but when the centrifugal device responds to the speed of rotation of the shaft 8, these cylindrical-segmental front ends 44 fly outwardly, against the force of the garter-spring 46, thus in effect providing an expanded annular surface or member, with greater circumferential spacings between the adjacent segments which make up the complete cylindrical surface of the expanded front end of the centrifugal device 21.

Any suitable means may be provided for guiding and retaining the bent segmental weight-devices 42 of the centrifugal device 21. A desirable structure is shown in Fig. 1, wherein a bell-shaped abutment 47 is mounted on the hub 40 in front of the annular groove 41, to provide an inner abutment or support for the bent segmental devices 42 in the non-responsive state of the centrifugal device 21. A guard 48, which may be pressed out of sheet-metal, is also mounted on the hub 40, being disposed back of the annular groove 41, and being welded to the hub, as shown at 49, this guard 48 being provided with slots or notches 50 for individually guiding the several bent segmental devices 42, and for providing a stop which limits the extreme outward movement of the segmental devices, in response to centrifugal force, as indicated by dotted lines in Fig. 1.

The operating-handle 28 of the switch 20 extends inwardly, in a generally axial direction, toward the centrifugal device 21. The front or handle-end of this operating-handle 28 is this inner end, which projects within the expansible and contractible annular member which is collectively provided by the cylindrical-segmental front ends 44 of the plurality of segmental devices 42. This front or inner end of the operating-handle 28 is provided with a head 58, having a rounded outer surface for engagement with the inner surfaces of the cylindrical-segmental front ends 44 of the respective segmental devices 42 of the centrifugal device 21.

In accordance with our invention, we provide an enlarged conduit-box 60 which is mounted on one side of the motor, being secured to the cylindrical outer surface of the stator-frame 16 by means of mounting-screws 61. Preferably, these mounting-screws 61 are the same screws which are utilized to secure the mounting-bar 22 to the inner cylindrical surface of the stator-frame 16, so that the stationary switch-part 20 of the centrifugal-switch assembly, and the conduit-box 60, are both secured by the same mounting-screws 61. As shown in the drawing, and as previously described, the mounting-bar 22 for the stationary switch-part 20 of the centrifugal-switch assembly extends axially along the inner surface of the cylindrical stator-frame 16 within one of the four axial ventilating-spaces between the frame and the four flat sides of the stator-core 14, while the base 62 of the conduit-box 60 is secured against the outer surface of the same part of the cylindrical stator-frame 16, so that the terminal-leads of the motor may be brought out through the same axial ventilating-space, and so that the thermal protector 66, which is disposed within the conduit-box 60 as subsequently described, may be seated within a hole in the cylindrical stator-frame 16 in reasonably intimate thermal relation thereto, so as to be responsive to the temperature of the frame, while also projecting into said axial ventilating-space, thus also clearing the square stator-core punchings 14.

The conduit-box 60 is preferably made in two parts, namely a base 62 and a top 63, and is of sheet-metal construction, with knockout portions 64 suitable for bringing in leads from any one of a plurality of different directions, as is customary in conduit-box construction. In addition to its normal function of providing a housing for the various terminal-connections involving the incoming leads and the various motor-terminals, our enlarged conduit box 60 is also utilized to provide a housing for two electrolytic capacitors 65, and it may also be used, in thermally protected motors, as the housing or mounting-place for a suitable thermal protector 66 of whatever type may be desired for protecting the motor against excessive temperatures. The illustrated thermal protector 66 is of a manual-reset type, having a reset-button 67 which is accessible from the front of the conduit-box.

In the practical operation of our invention, it will be noted that all of the terminal-equipment is combined into only slightly enlarged conduit-box 60, which is mounted on the side of the stator-frame 16. The electrolytic capacitor or capacitors 65 are placed inside of the conduit-box, where are to be found the terminals of the main and starting windings 15M and 15S, and the terminals of the centrifugal switch-contacts 23 and 24. By reason of this positioning of the capacitors 65, they require only extremely short terminal-leads, which are properly connected with respect to the rest of the motor-terminals, right there in the conduit-box.

It will further be noted that we have utilized our slightly enlarged conduit-box 60 as a seating-place for the thermal protector 66, any type of which may be provided, as may be desired, or it may be omitted altogether, if the motor is to be an unprotected machine, in which case the conduit-box knock-out-portion, at the place 69 where the thermal reset button 67 protrudes, will be left intact without being knocked out.

The construction of the conduit-box is such that it is easily accessible for changing the terminal-connections of the motor, as for clockwise rotation or counterclockwise rotation, or for adding or changing the type of thermal protection.

It is further to be noted that the mounting of all terminal equipment in one slightly enlarged conduit-box requires no additional machining or drilling, and requires only the parts which we have described.

An example of the nature of the terminal-connections which may be made in our conduit-box is shown diagrammatically in Fig. 3, wherein the main winding 15M, the starting-winding 15S, the rotor-parts including the shaft 8, squirrel-cage 11 and rotor-core 13, and the centrifugal switch 20, are the only parts which are not in the conduit-box 60. The two leads L1 and L2 of the single-phase supply-line are shown, in Fig. 3, as they enter the conduit-box. The supply-lead L1 is connected to the terminal-lead T1 of the main winding 15M and to the terminal-lead T2 of the starting-winding 15S. The other starting-winding terminal 70 is connected to the two serially connected capacitors 65, which are connected at 71 to the thermal-protector contacts 66, from which the circuit continues, through a conductor 72 to one terminal of the centrifugal switch 20, the other terminal of which is the motor-terminal T4. The second supply-lead L2 is connected to the terminal T3 of the main winding 15M and to the motor-terminal T4 which is the second terminal of the starting-winding circuit.

It will be noted that our mounting of the capacitor or capacitors 65 in a terminal-box 60, which is located on the outside of the motor-frame 16, not only gets the capacitor-terminals 70 and 71 away from the front end-bracket 5, thus facilitating the removal or replacement of the end-bracket, but at the same time it gets the capacitor or capacitors 65 outside of the motor-enclosure, which is important in a line of motors in which the convertibility-feature is stressed, whereby the same parts can be used, to a large extent, for open and enclosed motors. This is important, when using electrolytic capacitors, which are the most economical, and hence the desirable, form of capacitors, because the interior of totally enclosed motors runs too hot to admit of the internal mounting of such capacitors within the motor-enclosure.

While we have illustrated our invention in connection with a single illustrative size and type of motor, and while we have shown and described a single preferred illustrative structural form of enlarged conduit-box, with the terminal-equipment which is therein located, we wish it to be understood that our invention is not limited to the illustrated details. We desire, therefore, that the appended claims shall be accorded the broadest construction consistent with their language.

We claim as our invention:

1. A single-phase capacitor-start induction-motor, comprising a stationary primary member having a removable end-bracket at each end thereof, each end-bracket having a centrally disposed bearing, a shaft supported in said bearings, and a rotor-member carried by said shaft; said stationary primary member having a cylindrical stator-frame, a stator-core, and main and starting windings carried by said stator-core; said stator-core being made with square punchings having rounded corners which fit within the cylindrical stator-frame, thus providing four axially extending ventilating spaces between the flat sides of the punchings and the cylindrical stator-frame; a conduit-box mounted externally on said stationary primary member for the terminals of said main and starting windings; said conduit-box being secured against the outer surface of the cylindrical stator-frame in a position corresponding to the position of one of said axially extending ventilating-spaces; and an electrostatic capacitor-means also mounted within said conduit-box for series connection to said starting winding.

2. A dynamo-electric machine, comprising a stator-member having a removable end-bracket at each end thereof, each end-bracket having a centrally disposed bearing, a shaft supported in said bearings, and a rotor-member carried by said shaft; said stator-member having a cylindrical stator-frame, a stator-core, and windings carried by said stator-core; said stator-core being in contact with the inner surface of said cylindrical stator-frame at a plurality of points, and spaced therefrom at other points, thereby providing a plurality of axially extending ventilating spaces within said cylindrical stator-frame; a conduit-box mounted externally on said stator-member for the terminals of said windings; said conduit-box being secured against the outer surface of the cylindrical stator-frame in a position corresponding to the position of one of said axially extending ventilating-spaces; and a thermal protective device also mounted within said conduit-box for protecting the machine against excessive temperatures, said thermal protective device being seated within a hole in said cylindrical stator-frame in reasonably intimate thermal relation thereto, so as to be responsive to the temperature of the frame, while also projecting into said axial ventilating-space, thus also clearing the square stator-core.

3. A single-phase capacitor-start induction-motor, comprising a stationary primary member having a removable end-bracket at each end thereof, each end-bracket having a centrally disposed bearing, a shaft supported in said bearings, and a rotor-member carried by said shaft; said stationary primary member having a cylindrical stator-frame, a stator-core, and main and starting windings carried by said stator core; said stator-core being made with square punchings having rounded corners which fit within the cylindrical stator-frame, thus providing four axially extending ventilating-spaces between the flat sides of the punchings and the cylindrical stator-frame; a conduit-box mounted externally on said stationary primary member for the terminals of said main and starting windings; said conduit-box being secured against the outer surface of the cylindrical stator-frame in a position corresponding to the position of one of said axially extending ventilating-spaces; an electrostatic capacitor-means also mounted within said conduit-box for series connection to said starting winding; and a thermal protective device also mounted within said conduit-box for protecting the motor against excessive temperatures, said thermal protective device being seated within a hole in said cylindrical stator-frame in reasonably intimate thermal relation thereto, so as to be responsive to the temperature of the frame, while also projecting into said axial ventilating-space, thus also clearing the square stator-core.

JOSEPH M. STEIN.
ROBERT W. EGGLESTONE.

REFERENCES CITED

The following references are of record in the file of this patent:

UNITED STATES PATENTS

| Number    | Name        | Date          |
|-----------|-------------|---------------|
| 534,374   | Pieper et al. | Feb. 19, 1895 |
| 716,278   | Reist       | Dec. 16, 1902 |
| 1,866,344 | Brown       | July 5, 1932  |
| 1,929,755 | Mudge       | Oct. 10, 1933 |
| 1,987,662 | Bletz       | Jan. 15, 1935 |
| 2,017,255 | Norton      | Oct. 15, 1935 |
| 2,027,136 | Wood        | Jan. 7, 1936  |
| 2,376,863 | Bussmann    | May 29, 1945  |
| 2,391,115 | Anderson    | Dec. 18, 1945 |